US012146636B2

(12) United States Patent
Van Delden et al.

(10) Patent No.: US 12,146,636 B2
(45) Date of Patent: Nov. 19, 2024

(54) ARTIFICIAL SKYLIGHT

(71) Applicant: SIGNIFY HOLDING B.V., Eindhoven (NL)

(72) Inventors: Martinus Hermanus Wilhelmus Maria Van Delden, Shanghai (CN); Paul Philip Thursfield, Eindhoven (NL); Marcus Cornelis Van Meel, Helmund (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/269,427

(22) PCT Filed: Dec. 27, 2021

(86) PCT No.: PCT/EP2021/087674

§ 371 (c)(1),
(2) Date: Jun. 23, 2023

(87) PCT Pub. No.: WO2022/148684

PCT Pub. Date: Jul. 14, 2022

(65) Prior Publication Data

US 2024/0318796 A1 Sep. 26, 2024

(30) Foreign Application Priority Data

Jan. 5, 2021 (EP) ................................. 21150192.9

(51) Int. Cl.
*F21S 8/02* (2006.01)
*F21S 8/00* (2006.01)
(Continued)

(52) U.S. Cl.
CPC ............... *F21S 8/026* (2013.01); *F21S 8/006* (2013.01); *F21V 9/02* (2013.01); *F21Y 2113/20* (2016.08); *F21Y 2115/10* (2016.08)

(58) Field of Classification Search
CPC .............. F21S 8/026; F21S 8/006; F21V 9/02
See application file for complete search history.

(56) References Cited

U.S. PATENT DOCUMENTS

2009/0273302 A1 11/2009 Staats et al.
2016/0273723 A1 9/2016 Van Gheluwe et al.
(Continued)

FOREIGN PATENT DOCUMENTS

WO 2019063750 A1 4/2019
WO 2020175523 A1 9/2020
(Continued)

*Primary Examiner* — Tracie Y Green
*Assistant Examiner* — Michael Chiang

(57) ABSTRACT

An artificial skylight structured to emit light for imitating a sun-sky appearance, the artificial skylight comprising a sun-appearance imitating lighting fixture comprising a diffuser frame of visible light diffusing material, the diffuser frame forming side walls of a recessed window and a first light emitting source for emitting first light through the diffuser frame, as well as a sky-appearance imitating lighting fixture comprising 5*a* light exit panel being of visible light transmissive material and a further light emitting source for emitting second light through the light exit panel; wherein the light exit panel is mounted on the side walls of the recessed window of the diffuser frame of the sun-appearance imitating lighting fixture, and wherein the artificial skylight further comprises an optical element configured to limit first light emitted by the sun-appearance imitating lighting 10 fixture from exiting via the recessed light exit panel of the sky-appearance imitating lighting fixture.

15 Claims, 8 Drawing Sheets

(51) Int. Cl.

| | |
|---|---|
| ***F21V 9/02*** | (2018.01) |
| *F21Y 113/20* | (2016.01) |
| *F21Y 115/10* | (2016.01) |

(56) References Cited

U.S. PATENT DOCUMENTS

| | | | | |
|---|---|---|---|---|
| 2017/0257925 | A1 | 9/2017 | Forbis et al. | |
| 2018/0252374 | A1* | 9/2018 | Keller | F21S 19/005 |
| 2018/0275501 | A1 | 9/2018 | Takeshita et al. | |
| 2018/0279439 | A1 | 9/2018 | Takeshita et al. | |
| 2020/0063927 | A1 | 2/2020 | Leung et al. | |
| 2022/0186907 | A1* | 6/2022 | Fujii | F21S 19/005 |
| 2022/0196904 | A1* | 6/2022 | Fujii | F21V 9/02 |
| 2022/0221130 | A1* | 7/2022 | Okagaki | F21S 8/02 |

FOREIGN PATENT DOCUMENTS

| | | | |
|---|---|---|---|
| WO | 2020196594 | A1 | 10/2020 |
| WO | 2020240664 | A1 | 12/2020 |

* cited by examiner

ARTIFICIAL SKYLIGHT

CROSS-REFERENCE TO PRIOR APPLICATIONS

This application is the U.S. National Phase application under 35 U.S.C. § 371 of International Application No. PCT/EP2021/087674, filed on Dec. 27, 2021, which claims the benefit of European Patent Application No. 21150192.9, filed on Jan. 5, 2021. These applications are hereby incorporated by reference herein.

TECHNICAL FIELD

The invention relates to an artificial skylight structured to emit light for imitating a sun-sky appearance.

BACKGROUND OF THE INVENTION

There are numerous public or office buildings having apartments, which lack windows through which daylight can enter, e.g. control rooms, conference rooms, waiting rooms in hospitals, shops, archives, libraries. When people are present in such rooms they are disconnect from the outdoors, with the absence of windows causing a drop in their well-being. Moreover, in many countries regulations forbid a prolonged presence in such rooms. To restore the sense of being connected to nature in part, so-called artificial skylights or luminaires capable of emitting light have been developed, which light distribution imitates a sun-sky appearance. As such, during operation the artificial skylight imitates a window through which daylight is suggested to enter.

Such artificial skylights imitating a sun-sky appearance are often but not necessarily mounted in the ceiling of such rooms and provide a sun-sky appearance with a first diffused light component imitating sunlight, with the sun imitating element suggesting that sunlight impinges under an angle through the imitated window as well as a second diffused light component imitating the sky. An immersive light experience is created as a plurality of (different) (pixelated) light sources work together in one lighting system to provide a wide range of dynamic light scenes. In particular, an artificial sun-sky or skylight appearance can be created providing a realistic illusion of natural skylight, having an infinite blue sky.

Although known artificial skylights provide a realistic imitation of a real window, they suffer from stray light leaving the lighting fixture at unwanted locations and in undesired directions. In particular such light artefacts disturb the perception of the lighting fixture. Such disturbances adversely affect the overall lighting luminance imitating the sun-sky appearance as they are clearly visible for a viewer when viewing the imitated window under certain observation angles.

It is an object of the invention to provide an artificial skylight capable of emitting light imitating a sun-sky appearance with a more realistic impression of a window through which light is suggested to enter a space or room without undesirable disturbances in the overall lighting luminance.

SUMMARY OF THE INVENTION

According to a first aspect of the disclosure an artificial skylight for emitting light imitating a sun-sky appearance is proposed, the artificial skylight at least comprising at least one sun-appearance imitating lighting fixture comprising a diffuser frame made from a visible light diffusing material, the diffuser frame forming side walls of a recessed window and at least one first light emitting source for emitting first light through at least part of the diffuser frame, as well as a sky-appearance imitating lighting fixture comprising a light exit panel being made from a visible light transmissive material having an inner portion extending over the recessed window and at least one further light emitting source for emitting second light through the light exit panel: wherein the light exit panel is mounted on the side walls of the recessed window of the diffuser frame of the at least one sun-appearance imitating lighting fixture, and wherein the artificial skylight further comprises at least one optical element configured, during operation of the artificial skylight, to limit first light emitted by the at least one sun-appearance imitating lighting fixture from exiting via the recessed light exit panel of the sky-appearance imitating lighting fixture, wherein the at least one optical element is part of the sky-appearance imitating lighting fixture, and wherein the at least one optical element provided at the light exit panel exhibits, seen in the plane formed by the recessed light exit panel, a longitudinal dimension extending past a wall thickness dimension of the diffuser frame over the inner portion of the light exit panel.

Any disturbances or light artefacts in the overall light luminance exiting the lighting fixture are counteracted (blocked and/or absorbed) and the generation of a realistic view of the artificial sun-sky or skylight appearance is improved. Thus a defined transition between the side walls and the clear light exit panel is provided, that gives a feeling of precision and quality to the artificial skylight as a whole and creates a more realistic impression of a window through which light enters without undesirable light disturbances in the overall lighting luminance. The lighting fixture thus presents a more realistic view of an artificial sun-sky or skylight appearance.

In particular the at least one optical element is configured to block and/or absorb first light emitted by the at least one sun-appearance imitating lighting fixture from exiting via the recessed light exit panel of the sky-appearance imitating lighting fixture.

The inner portion extends over the recessed window that is located within the diffuser frame that forms the side walls or perimeter of the recessed window. The light exit panel further has an outer portion or outer periphery portion that extends outside the perimeter formed by said diffuser frame.

In a first example of the disclosure, the at least one optical element is part of the sky-appearance imitating lighting fixture.

In particular the at least one optical element is provided at the side of the recessed light exit panel facing towards the at least one further light emitting source and/or the at least one optical element is provided at the side of the recessed light exit panel facing away the at least one further light emitting source. More in particular the at least one optical element is provided at the outer periphery portion of the light exit panel.

In an advantageous example of the disclosure, the at least one optical element is provided where the light exit panel mechanically contacts the diffuser frame of the at least one sun-appearance imitating lighting fixture forming the side walls around the recessed light exit panel. More in particular the at least one optical element is provided at the outer periphery portion of the light exit panel.

By providing the at least one optical element at locations where the light exit panel mechanically contacts the diffuser frame of the at least one sun-appearance imitating lighting fixture forming the side walls around the recessed light exit panel, light emitted by the sun-appearance imitating lighting fixture is not reflected via the sky-appearance imitating lighting fixture and thus reflection and/or transmission of this diffused light in the light distribution of the sky-appearance imitating lighting fixture and exiting the light exit panel is prevented.

As such, any disturbing light artefacts in the overall light luminance exiting the light exit panel are blocked and/or absorbed and an improved and more realistic view of an artificial sun-sky or skylight appearance is generated.

In an example of the disclosure the at least one optical element is made from a visible light absorbing material.

Preferably, the longitudinal dimension of the at least one optical element extending past the wall thickness dimension of the diffuser frame over the inner portion of the light exit panel is no more than 10 mm, preferably no more than 6 mm, even more preferably no more than 4 mm.

In yet another advantageous example of the disclosure, the at least one optical element is part of the at least one sun-appearance imitating lighting fixture. And in particular, the at least one optical element is provided at the diffuser frame bordering the recessed light exit panel. Likewise, disturbances or light artefacts in the overall light luminance exiting the lighting fixture are avoided and the generation of a realistic view of the artificial sun-sky or skylight appearance is improved.

In exemplary embodiments, the at least one optical element is formed as a visible light absorbing coating or a visible light absorbing adhesive foil, sheet or panel. Additionally, the at least one optical element can be formed as an integral visible light absorbing part of the light exit panel and/or the diffuser frame. Alternatively, the at least one optical element is mechanically clamped between the light exit panel and the diffuser frame.

In exemplary embodiments the light exit panel is clear transparent, i.e. non-diffusing, for visible light. This further enhances the realistic experience of natural skylight. This realistic experience is even further enhanced in embodiments wherein the light exiting the light exit panel has a slightly blue color, which can be attained by the exit panel being clear, i.e. non diffusing, blue colored and preferably a color saturation S in the range of 5 to 30%, for example in that the light exit panel has a transparency in the range of 70 to 95%.

BRIEF DESCRIPTION OF THE DRAWINGS

The invention will now be discussed with reference to the schematic drawings in which some part may be exaggerated in size for the sake of explanation and/or clarity, the drawings show in.

DETAILED DESCRIPTION OF THE INVENTION

Figure 1:
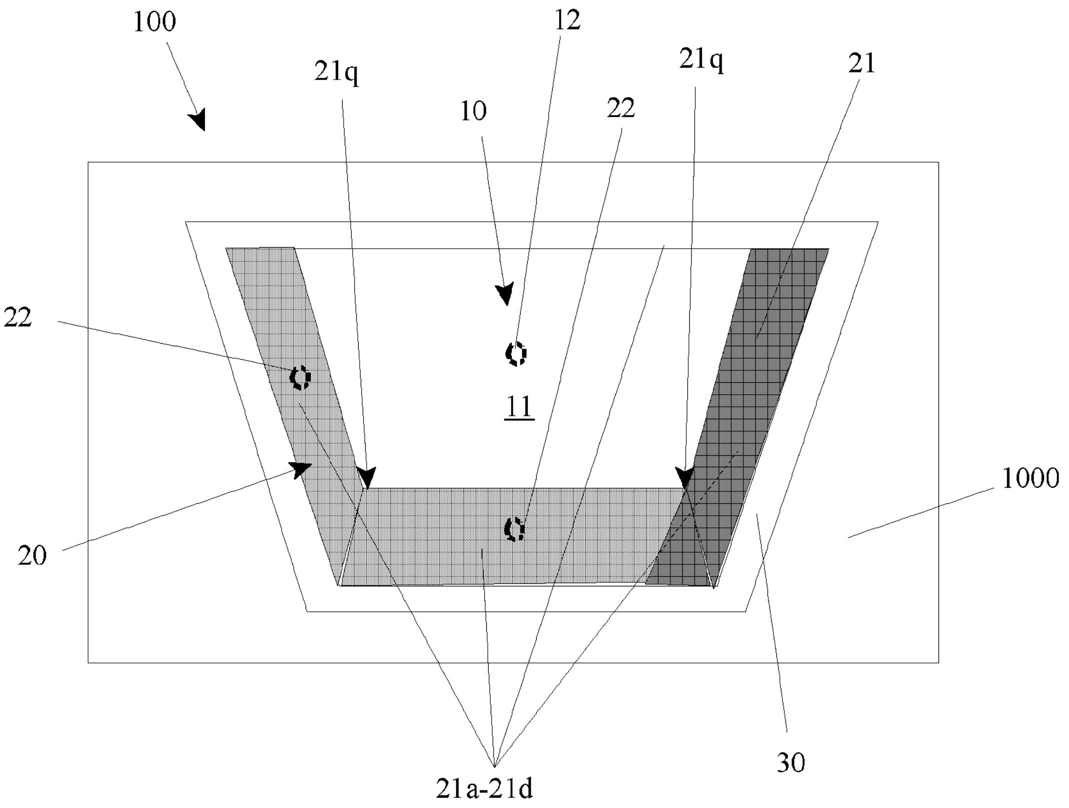
FIG. 1 a first example of a lighting fixture (or artificial skylight) according to the disclosure.

For a proper understanding of the invention, in the detailed description below corresponding elements or parts of the invention will be denoted with identical reference numerals in the drawings.

FIG. 1 depicts a first example of an artificial skylight, capable of imitating a sun-sky appearance mounted in the ceiling 1000 of a room. In particular, such artificial skylights are installed in rooms or apartments of for example public or office buildings, which rooms lack windows through which daylight can enter. Examples of such rooms can be e.g. control rooms, conference rooms, waiting rooms in hospitals, shops, archives, libraries, etc. Studies have shown, that the absence of windows and thus the lack of exposure to daylight causes a drop in the wellbeing of people present in such rooms. As a consequence, many countries have implemented labour regulations forbidding a prolonged presence in such rooms.

This has resulted in the development of so-called artificial skylights or luminaires capable of emitting light, which light distribution imitates a sun-sky appearance. Although such artificial skylights provide a realistic imitation of a real window, their construction still allow stray light leaving the artificial skylight at unwanted locations and in undesired directions. In particular such light artefacts disturb the direct-light component of the lighting fixture. Such disturbances adversely affect the overall lighting luminance 20 imitating the sun-sky appearance as they are clearly visible for a viewer when viewing the imitated window.

In the example of the disclosure as shown in FIG. 1, the artificial skylight for emitting light imitating a sun-sky appearance is denoted with reference numeral 100 and mounted in a ceiling 1000, thus imitating a blind roof window. Note, the artificial skylight 100 can also be mounted in a blind wall of the room, thus imitating a blind window.

The sun-sky appearance created by the artificial skylight 100 is composed of a first light component and a second light component. Hereto, in the example of FIG. 1, the artificial skylight 100 comprises a sky-appearance imitating lighting fixture denoted with reference numeral 10, structured to emit the second light component and a sun-appearance imitating lighting fixture denoted with reference numeral 20, structured to emit the first light component.

Figure 2:
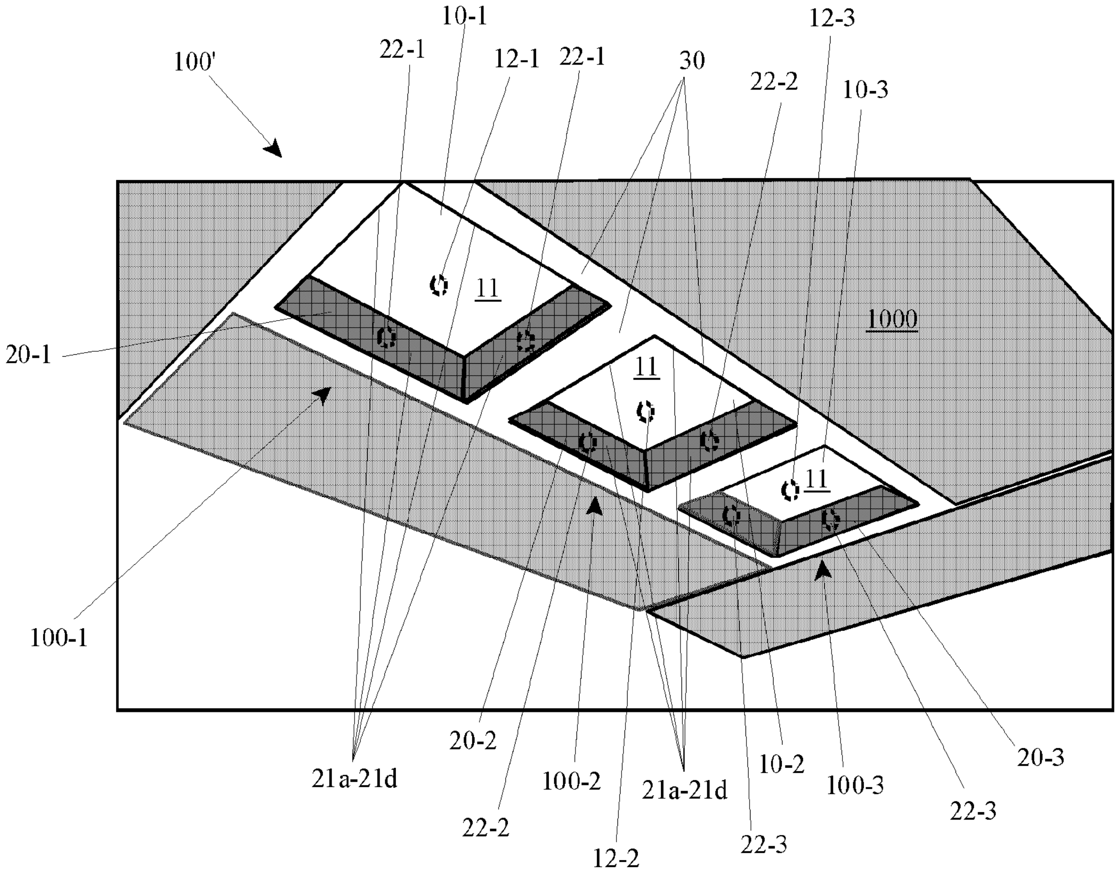
FIG. 2 a further example of a lighting fixture according to the disclosure.

Alternatively, in the example of FIG. 2, the artificial skylight is denoted with 100' and can be considered as an artificial skylight system or assembly comprising multiple, here three individual artificial skylights 100-1, 100-2, 100-3 (100-*x* in general), the assembly 100' being composed of—in this example—three sky-appearance imitating lighting fixtures 10-1, 10-2 and 10-3 as well as and multiple, here three sun-appearance imitating lighting fixtures 20-1, 20-2, 20-3. However, the disclosure is not limited to configurations of artificial skylights, each composed of one or three sky-appearance imitating lighting fixtures 10 and sun-appearance imitating lighting fixtures 20. Other combinations of an x-number of sky-appearance imitating lighting fixtures 10-*x* and sun-appearance imitating lighting fixtures 20-*x* are possible, with x being 1, 2, 3, 4, etc. etc.

Returning to the example of FIG. 1, the sky-appearance imitating lighting fixture 10 comprises a light exit panel 11 being made from a visible light transmissive material, such as polycarbonate. Typically, the light exit panel is clear, i.e. transparent or non-diffusing for (visible) light. Additionally, at least one light emitting source 12 is mounted behind the light exit panel 11 as seen from a viewer present in the room in which the artificial skylight 100 is installed. The at least one light emitting source 12 serves to emit a second light component through the light exit panel 11 towards the room (and the persons present).

Although in FIG. 1 one light emitting source 12 is depicted schematically at the center of the light exit panel 11, a plurality of (different) (pixelated) lighting devices 12 can be mounted behind the light exit panel 11 in an even distribution, thus creating the desired second light distribution imitating a sky-appearance. Similarly, in the example of FIG. 2, multiple second light emitting sources 12-1, 12-2, 12-3 (or in general denoted with 12-*x*) can be mounted behind each light exit panel 11 of each sky-appearance imitating lighting fixture 10-1, 10-2 and 10-3 (10-*x*).

In FIGS. 1 and 2, the sun-appearance imitating lighting fixture 20 (20-1, 20-2, 20-3) is composed of a diffuser frame indicated with 21. The diffuser frame 21 is made from a visible light diffusing material, such as for example, acrylic (PMMA/Plexiglas®), polycarbonate (Lexaan®/Makrolon®), PETG (Vivak®). The diffuser frame 21 is composed of a construction of interconnected side walls of said visible light diffusing material, in the example of FIGS. 1 and 2 four side walls 21*a*-21*d*. The interconnected side walls 21*a*-21*d* are shaped as elongated wall elements, which are interconnected with each other at their wall ends, thus forming of the border or chambranle of a recessed (blind) window:

In FIGS. 1 and 2 the diffuser frame 21 has a square or rectangular configuration, however also other (simple) polygon shaped configurations are possible, for example a diffuser frame 21 having a triangle configuration, thus composed of three interconnected side walls 21*a*-21*b*-21*c*. Also other polygons, such as convex regular n-gons are feasible. In a particular example the diffuser frame 21 may have a circular configuration composed of one or more circular shaped side walls.

Each sun-appearance imitating lighting fixture 20 (20-1, 20-2, 20-3 in FIG. 2 or in general denoted with 20-*x*) comprises at least one first light emitting source 22 (22-1, 22-2, 22-3 in FIG. 2 or in general denoted with 22-*x*) for emitting a first light component or first light through at least part of the diffuser frame 21. Also here, one first light emitting source 22 is depicted schematically in the middle of the length dimension of each of the side walls 21*a* and 21*b*. However, multiple (pixelated) first light emitting sources 22 can be mounted behind each side walls in an even distribution, thus creating the desired first light distribution imitating a sun-appearance.

In an example the light emitting sources 12 and 22 are LED sources.

Optional, the complete construction of the sky-appearance imitating lighting fixture 10 and the sun-appearance imitating lighting fixture 20 are accommodating in a housing frame of the artificial skylight 100 and 100' (FIG. 2), allowing a simple and aesthetic mounting in a flush manner in the ceiling 1000. The effect to create a realistic feeling illusion of natural skylight, having an infinite blue sky can relate to the aspect of a clear, transparent light exit window, arranged downstream of a recessed LED panel, providing a blue sky effect and to another aspect of visible Fresnel reflections on the light exit window of the inner sidewall(s) arrangement, surrounding the recessed panel and arranged downstream of the light exit window.

Figure 3:
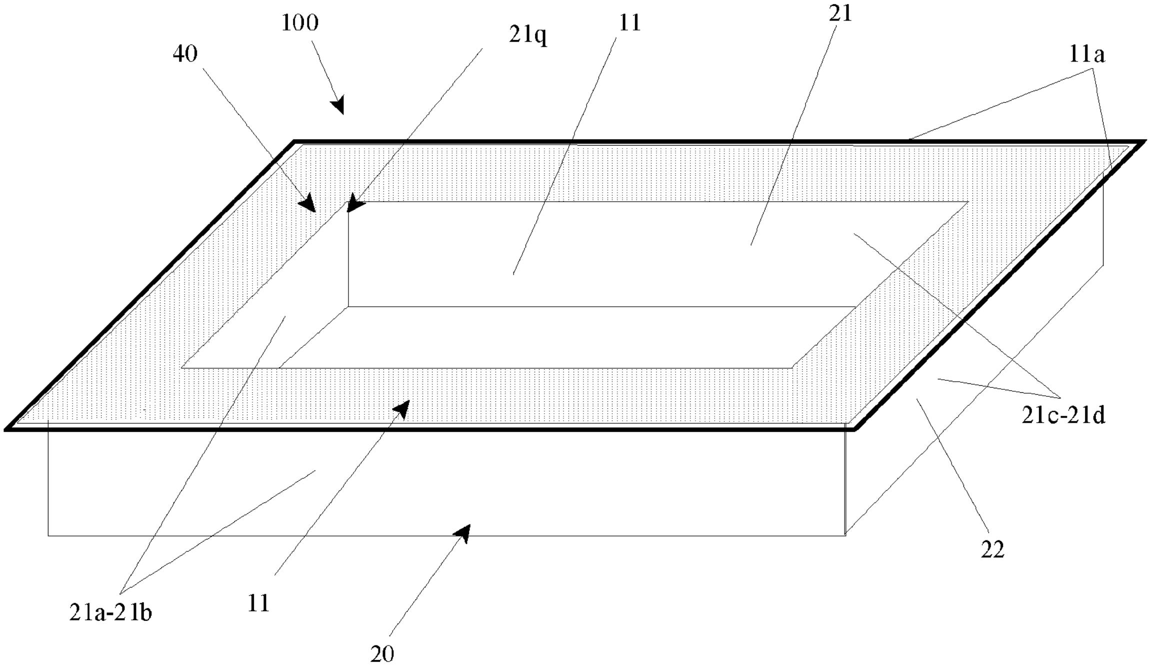
FIG. 3 another view of FIG. 1.

FIG. 3 depicts the first example of the artificial skylight 100 if FIG. 3 in more detail, with the light exit panel 11 facing an observer in the room. The light exit panel 11 is mounted on the elongated side edges of the side walls 21*a*-21*d* forming the recessed window of the diffuser frame 21 of each of the sun-appearance imitating lighting fixtures.

The light exit panel 11 is combined with several light emitting sources 12-1, 12-2, 12-3 (in general 12-*x*), each of the single or multiple light emitting sources 12-*x* being allocated to one of the sky-appearance imitating lighting fixtures 10-*x*.

The mounting of the light exit panel 11 on the elongated side edges of the side walls 21*a*-21*d* of each diffuser frame 21 presents a constructional challenge as to lightproofness. Due to the use of more or less light transmissive materials for both the light exit panel 11 and the side walls 21*a*-21*d* of each diffuser frame 21, first light emitted by in particular the several first light emitting sources 22-*x* positioned behind the side walls 21*a*-21*d* will exit through the side walls 21*a*-21*d* as intended, but might also leave the artificial skylight 100 (100') as stray light of the first light component via the light exit panel 11 due to internal reflection.

This stray light of the first light component leaving the artificial skylight 100-100' via the light exit panel 11 of the sky-appearance imitating lighting fixture 10 creates undesired light artefacts disturbing the second light component of the sky-appearance imitating lighting fixture 10. In particular, see FIG. 4, these light artefacts created by first light emitted by the first light emitting sources 22 (22-*x*) of the sun-appearance imitating lighting fixture 20 (20-*x*) are visible near the mounting edges or junctions 21*q* between the side walls 21*a*-21*d* and the light exit panel 11 are denoted in FIG. 4 with the capital letter L. These light spots or artefacts L disturb the direct-light distribution of the light emitting source(s) 11 (11-*x*) of each sky-appearance imitating lighting fixture 10 (10-*x*).

In order to avoid the occurrence of such light disturbances one or more optical elements 40 are provided, which are configured, during operation of the artificial skylight 100 (100'), to limit first light L emitted by the sun-appearance imitating lighting fixtures 20 (20-*x*) from exiting via the recessed light exit panel 11 of each of the sky-appearance imitating lighting fixtures 10 (10-*x*).

Figure 5:
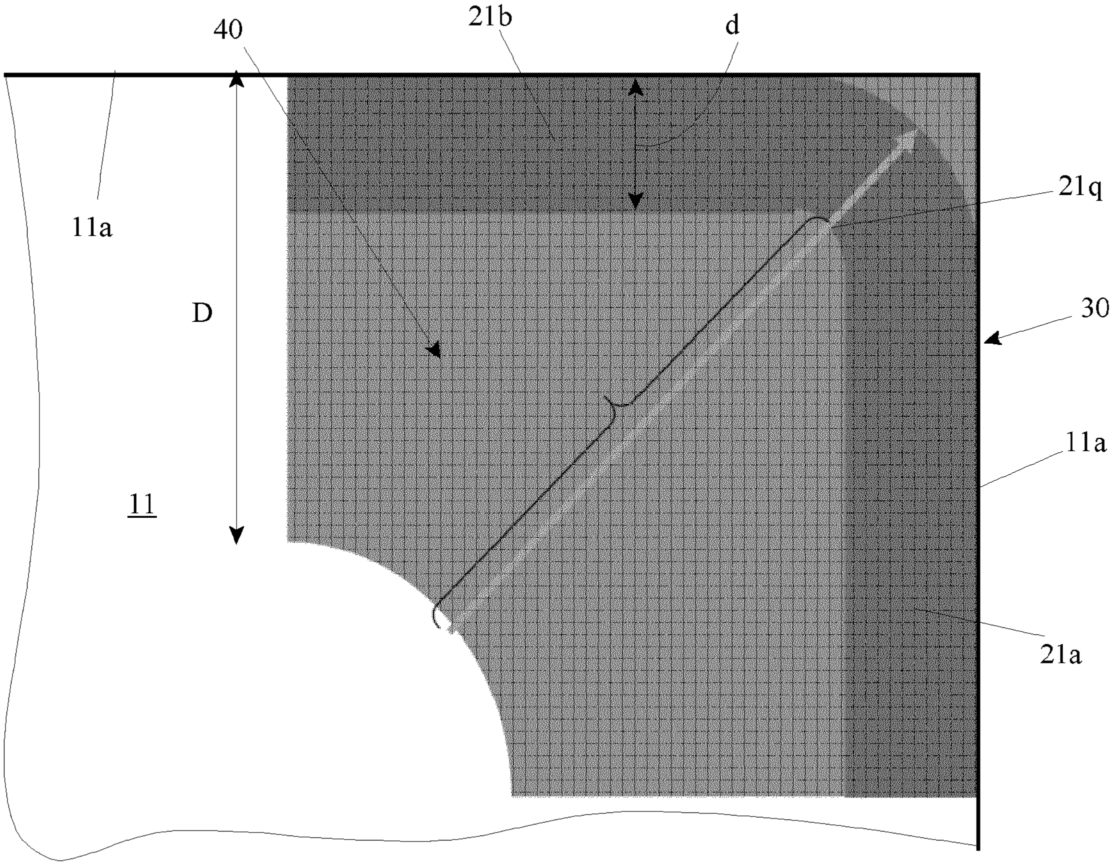
FIG. 5 a further detail of the first or further example of a lighting fixture according to the disclosure shown in FIG. 1 or 2.

An example of such optical element 40 is depicted in FIG. 3 and FIG. 5. In particular the optical element 40 is part of each sky-appearance imitating lighting fixture 10-*x*, and in particular the element 40 is provided at the side of the recessed light exit panel 11 facing towards the further light emitting source(s) 12-*x*, and thus away from an observer present in the room in which the artificial skylight 100-100' is installed, as shown in the example of FIG. 3. In another example the optical element 40 is provided at the side of the recessed light exit panel 11 facing away the at least one further light emitting source 12-*x* and thus towards an observer present in the room in which the artificial skylight 100-100' is installed. More in particular and as shown in both FIGS. 3 and 5, the optical element 40 is provided at the outer periphery portion 11*a* of the direct-light exit panel 11.

Figure 4:
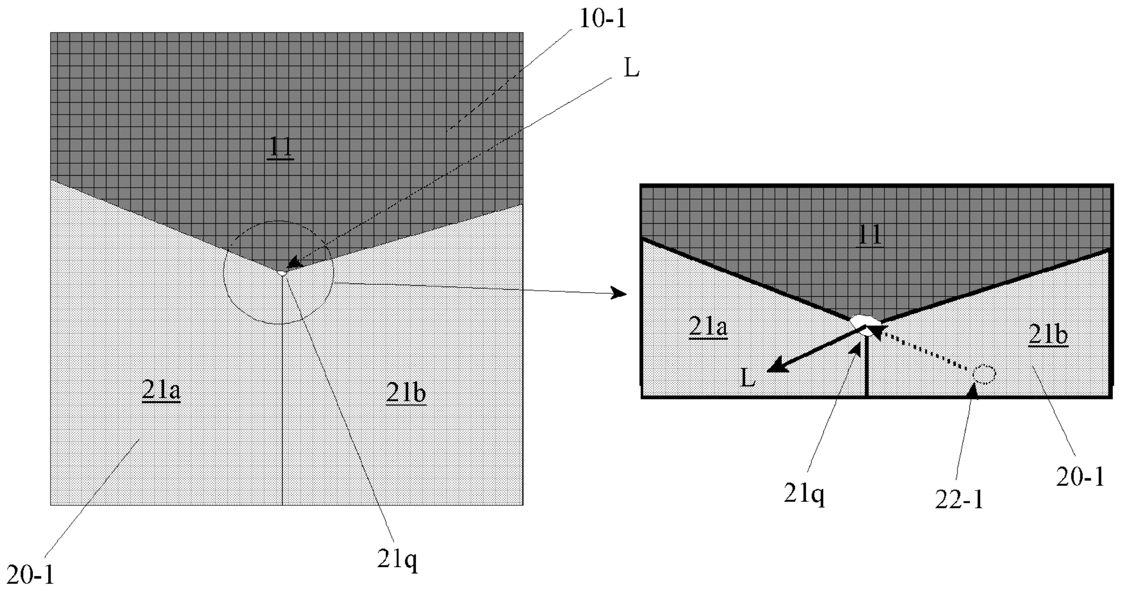
FIG. 4 a detail of the first or further example of a lighting fixture according to the disclosure shown in FIG. 1 or 2.

In FIGS. 3 and 5, combined with FIG. 4, it is preferred, to have the optical element 40) (or several optical elements 40) present where the light exit panel 11 mechanically contacts the diffuser frame 21-*x* of each sun-appearance imitating lighting fixture 20-*x*, in particular where the (outer periphery portion 11*a* of the) panel 11 contacts or abuts the (elongated side edges of the) side walls 21*a*-21*d*. In one example, as shown in FIGS. 3 and 5, the at least one optical element 40 is provided at the outer periphery portion 11*a* of the direct-light exit panel 11, whereas in another example of the disclosure, the at least one optical element 40 is part of or present on the diffuser frame 21 bordering the recessed light exit panel 11. For example, the at least one optical element 40 is applied along the elongated side edges of the side walls 21*a*-21*d* directly contacting the light exit panel 11.

In both examples, the one or more optical element 40 at locations where the light exit panel 11 mechanically contacts the diffuser frame 21 of each sun-appearance imitating lighting fixture 20 (20-*x*) and in particular contacts the side walls 21*a*-21*d* around the recessed light exit panel 11, any stray first light emitted by the first light emitting sources 22 (22-*x*) of the sun-appearance imitating lighting fixture 20 (20-*x*) are blocked or absorbed by the optical element(s) 40. Such stray first light is not reflected via the light exit panel 11. Disturbing first light artefacts in the overall light luminance exiting the light exit panel 11 are blocked and/or absorbed and an improved and more realistic view of an artificial sun-sky or skylight appearance is generated.

Preferably, the at least one optical element 40 is made from a visible light absorbing material. As shown in FIG. 5, the optical element 40 provided on either side of the light exit panel 11 has a longitudinal dimension D, which extends past (or is larger than) a wall thickness dimension d of the side walls 21*a*-21*d* of the diffuser frame 21. In a similar manner, any stray first light L (see FIG. 4) emitted by the light emitting sources 22 (22-*x*) of the sun-appearance imitating lighting fixtures 20 (20-*x*) within the inner construction of the artificial skylight 100-100' towards the light exit panel 11 is blocked or absorbed by the optical element (s) 40 and thus prevented from exiting the light exit panel 11 and c100-100' through internal reflection.

Disturbances or light artefacts in the overall light luminance exiting via the light exit panel 11 are avoided (blocked and/or absorbed).

In particular, the longitudinal dimension D of the optical element 40 extending past the wall thickness dimension d of the side walls 21*a*-21*d* of the diffuser frame 21 over the inner portion is no more than 10 mm, preferably no more than 6 mm, even more preferably no more than 4 mm. Herewith, the optical element 40 on either side of the light exit panel 11 will be less visible for an observer, thus maintaining a realistic view of the artificial sun-sky or skylight appearance of the light exit panel 11.

In exemplary embodiments, the at least one optical element 40 is formed as a visible light absorbing coating or a visible light absorbing adhesive foil, sheet or panel, provided on either side of the light exit panel 11. Also, the optical element 40 can be formed as an integral visible light absorbing part of the light exit panel 11 and/or the diffuser frame 21. Alternatively, the optical element 40 is a separate component, which is mechanically clamped between the light exit panel 11 and the diffuser frame 21.

Figure 6:
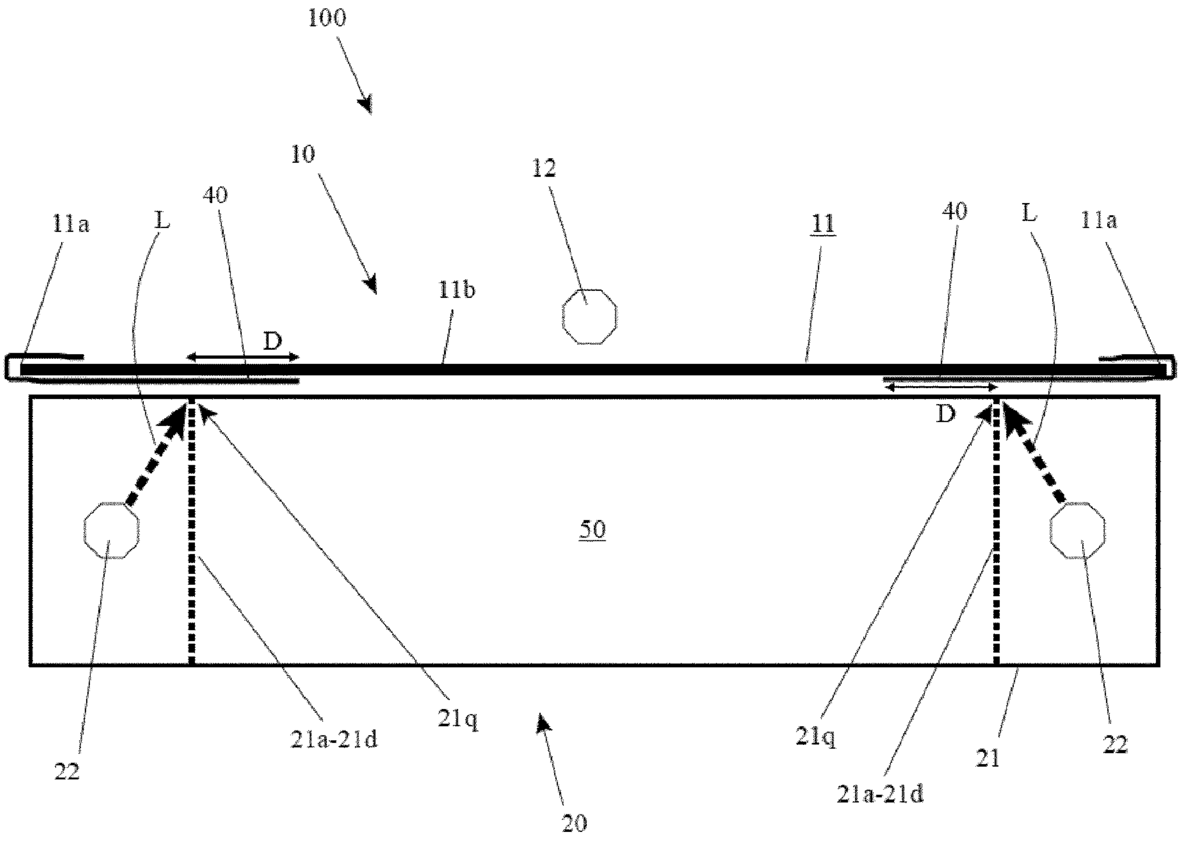
FIG. 6-8 show a cross-section of respectively a first, second and third example of a lighting fixture according to the disclosure.

In an example of a cross sectional view of an artificial skylight according to the invention as depicted in FIG. 6, the at least one optical element 40 is structured as a separate profiled member, preferable from a flexible material, such as a rubber material. When the at least one optical element is executed as a separate part, such as a light absorbing foil or sheet of 3D compliant material (further reducing the material gap size), it may be made from materials such as paper, cardboard, plastic, foam or rubber, for example. Or it may be executed as a sheet or L-shape rubber lining, for example, being mechanically clamped in between the diffuser frame of the artificial skylight and the light exit panel, arranged "floating" or as an adhesive fixated part. The profiled member serves as a sealing member or liner or collar, which can be mounted in a clamping manner to or around either the outer periphery portion 11*a* of the direct-light exit panel 11, or the elongated side edges of the side walls 21*a*-21*d* of the diffuser frame 21. The light exit panel 11 comprises an outer periphery portion 11*a*, surrounding an inner portion 11*b* of the light exit panel. The inner portion 11*b* extends over the recessed window 50. As shown the optical element (or profiled member) 40 extends over about a distance D over an inner portion 11*b* of the light exit panel 11. This is the case along the complete circumferential side wall formed by side walls 21*a*-21*d* (not visible in the cross section view) and counteracts emission of stray light due to artefacts.

Figure 7:
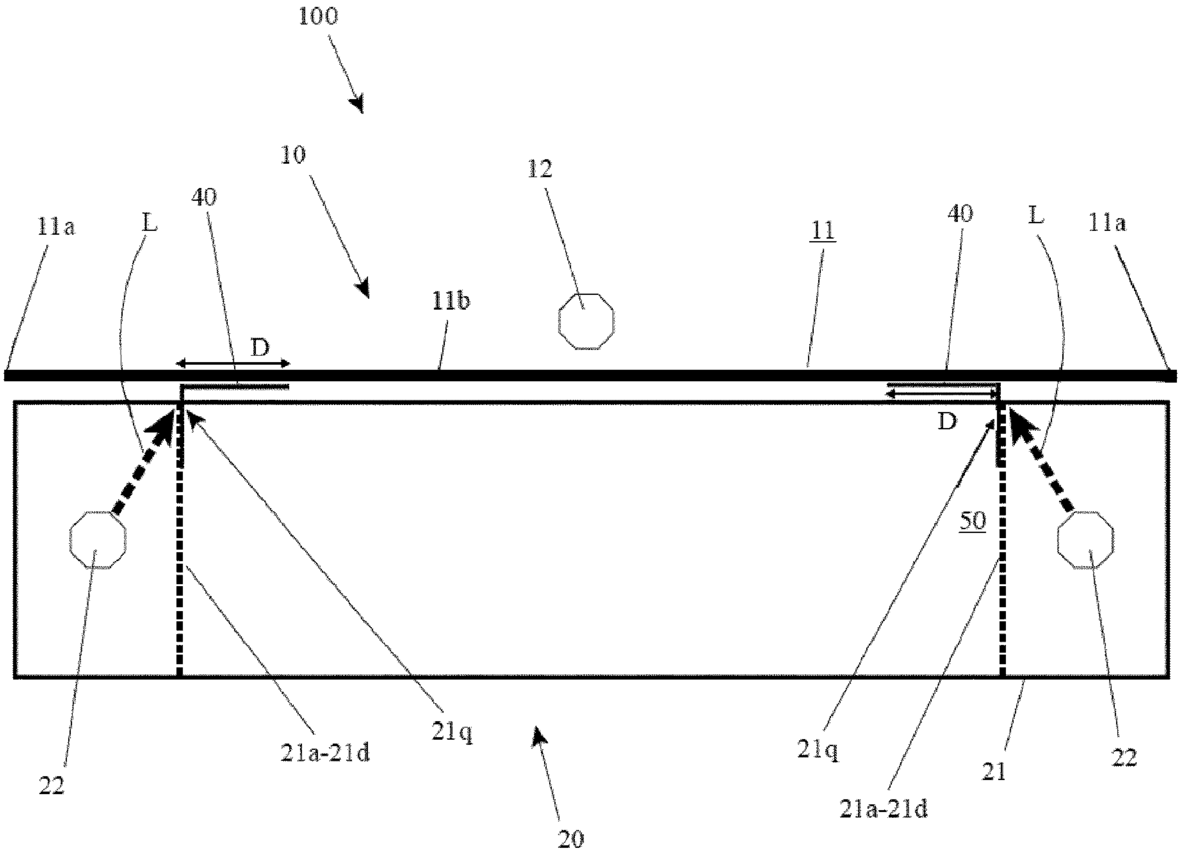
Figure 8:
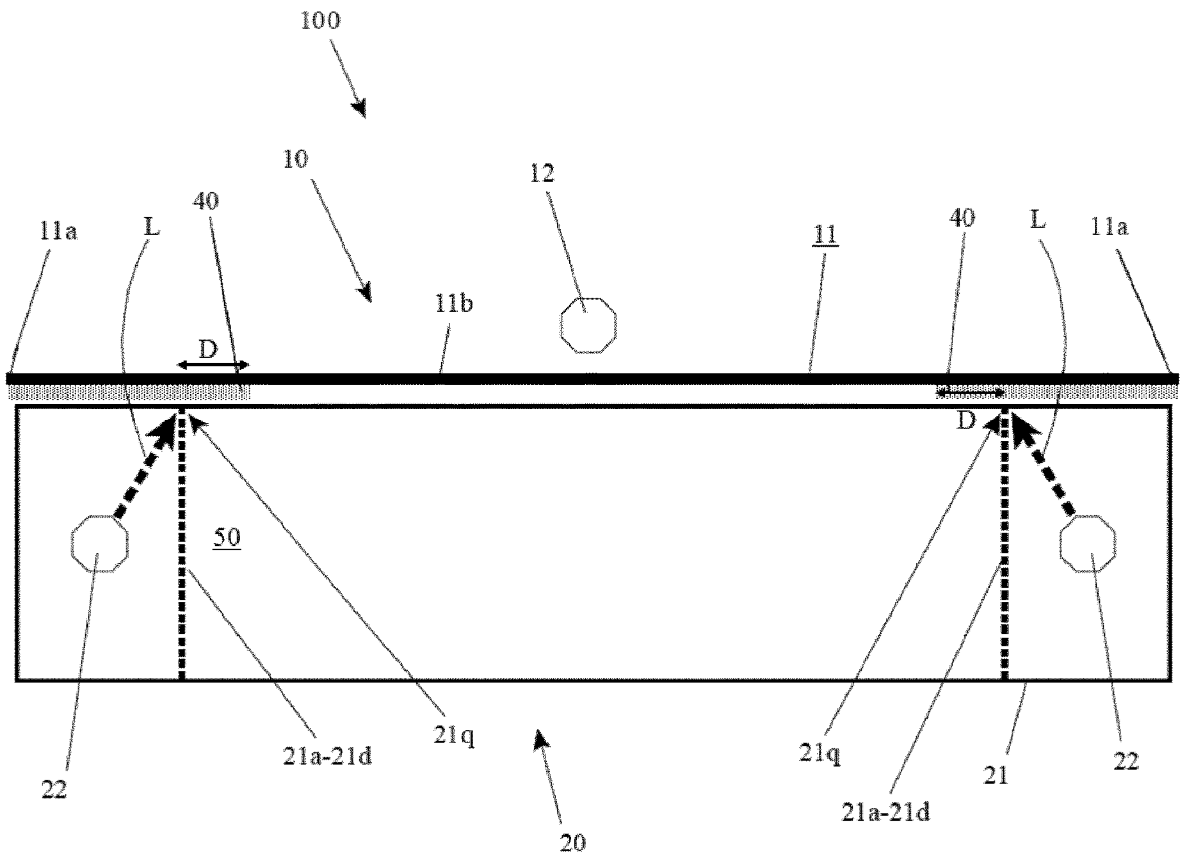

FIGS. 7 and 8 show similar cross sections of the artificial skylight according to the invention as shown in FIG. 8 wherein the optical element 40 extends over a distance D over the inner portion 11*b* of the light exit panel 11. Yet, in FIG. 7 the optical element 40 is attached to side walls 21*a*-21*d* of the diffuser frame and is part of the sun-appearance imitating lighting fixture 20. In FIG. 8 the optical element 40 is formed as a light absorbing coating, such as a spray coating, a printed layer or a (thicker) adhesive sheet, on at least a part of the inner portion 11*b* of the light exit panel 11, and is part of the sky-appearance imitating lighting fixture 10.

REFERENCE NUMERALS USED

1000 ceiling
100 artificial skylight
100' artificial skylight system or assembly
100-*x* artificial skylight (with x=1, 2, 3, etc.)
10-*x* sky-appearance imitating lighting fixture (with x=1, 2, 3, etc.)
11 light exit panel
11*a* outer periphery portion of light exit panel
11*b* inner portion of light exit panel 12-*x* further light emitting source (with x=1, 2, 3, etc.)
20-*x* sun-appearance imitating lighting fixture (with x=1, 2, 3, etc.)
21 diffuser frame
21*a*-21*d* side walls of diffuser frame
21*q* corner or junction between diffuser frame and light exit panel
22-*x* first light emitting source (with x=1, 2, 3, etc.)
30 housing of artificial skylight
40 optical element
50 recessed window

The invention claimed is:

1. An artificial skylight structured to emit light for imitating a sun-sky appearance, the artificial skylight at least comprising:
- at least one sun-appearance imitating lighting fixture comprising:
  - a diffuser frame made from a visible light diffusing material, the diffuser frame forming side walls of a recessed window and
  - at least one first light emitting source for emitting first light through at least part of the diffuser frame, as well as
- a sky-appearance imitating lighting fixture comprising:
  - a light exit panel being made from a visible light transmissive material and having an inner portion extending over the recessed window, said inner portion is located within the diffuser frame, and
  - at least one further light emitting source for emitting second light through the light exit panel; wherein
- the light exit panel is mounted on the side walls of the recessed window of the diffuser frame of the at least one sun-appearance imitating lighting fixture, and wherein the artificial skylight further comprises:

at least one optical element configured, during operation of the artificial skylight, to limit first light emitted by the at least one sun-appearance imitating lighting fixture from exiting via the recessed light exit panel of the sky-appearance imitating lighting fixture, wherein the at least one optical element is part of the sky-appearance imitating lighting fixture, and wherein the at least one optical element provided at the light exit panel exhibits, seen in the plane formed by the recessed light exit panel, a longitudinal dimension extending past a wall thickness dimension of the diffuser frame over the inner portion of the light exit panel.

2. The artificial skylight according to claim 1, wherein the at least one optical element is configured to block and/or absorb first light emitted by the at least one sun-appearance imitating lighting fixture from exiting via the recessed light exit panel of the sky-appearance imitating lighting fixture.

3. The artificial skylight according to claim 1, wherein the light exit panel is transparent.

4. The artificial skylight according to claim 1, wherein the at least one optical element is provided at the side of the recessed light exit panel facing towards the at least one further light emitting source.

5. The artificial skylight according to claim 1, wherein the at least one optical element is provided at the side of the light exit panel facing away from the at least one further light emitting source.

6. The artificial skylight according to claim 1, wherein the at least one optical element is provided where the light exit panel mechanically contacts the diffuser frame of the at least one sun-appearance imitating lighting fixture forming the side walls around the recessed light exit panel.

7. The artificial skylight according to claim 1, wherein the at least one optical element is made from a visible light absorbing material.

8. The artificial skylight according to claim 1, wherein the light exit panel is a transparent, blue colored panel having a color saturation in the range of 5% to 30%.

9. The artificial skylight according to claim 1, wherein the longitudinal dimension of the at least one optical element extending past the wall thickness dimension of the diffuser frame over the inner portion of the light exit panel is no more than 10 mm, preferably no more than 6 mm, even more preferably no more than 4 mm.

10. The artificial skylight according to claim 1, wherein the at least one optical element is part of the at least one sun-appearance imitating lighting fixture.

11. The artificial skylight according to claim 10, wherein the at least one optical element is provided at the diffuser frame bordering the recessed light exit panel.

12. The artificial skylight according to claim 1, wherein the at least one optical element is formed as a visible light absorbing coating or a visible light absorbing adhesive foil, sheet or panel.

13. The artificial skylight according to claim 1, wherein the at least one optical element is formed as an integral visible light absorbing part of the light exit panel and/or the diffuser frame.

14. The artificial skylight according to claim 1, wherein the at least one optical element is mechanically clamped between the light exit panel and the diffuser frame.

15. The artificial skylight according to claim 14, wherein the at least one optical element is structured as a profiled collar.

* * * * *